United States Patent [19]

O'Connell

[11] 4,361,884
[45] Nov. 30, 1982

[54] VIDEO DISC PLAYER HAVING CLICK MECHANISM

[75] Inventor: Philip E. O'Connell, Indianapolis, Ind.

[73] Assignee: RCA Corporation, New York, N.Y.

[21] Appl. No.: 203,757

[22] Filed: Nov. 3, 1980

[51] Int. Cl.³ .............................................. G11B 27/34
[52] U.S. Cl. ..................................................... 369/77
[58] Field of Search ......................... 369/77, 261, 287; 358/128.5, 128.6; 360/133, 99

[56] References Cited

U.S. PATENT DOCUMENTS 4,133,540  1/1979  Torrington ........................... 369/77
4,159,827  7/1979  Torrington ........................... 369/77

Primary Examiner—Harry N. Haroian
Attorney, Agent, or Firm—E. M. Whitacre; J. S. Tripoli; D. A. Kulkarni

[57] ABSTRACT

A video disc player is provided with a mechanism for providing an audible click just as the record caddy arrives at a fully inserted position in the player.

6 Claims, 5 Drawing Figures

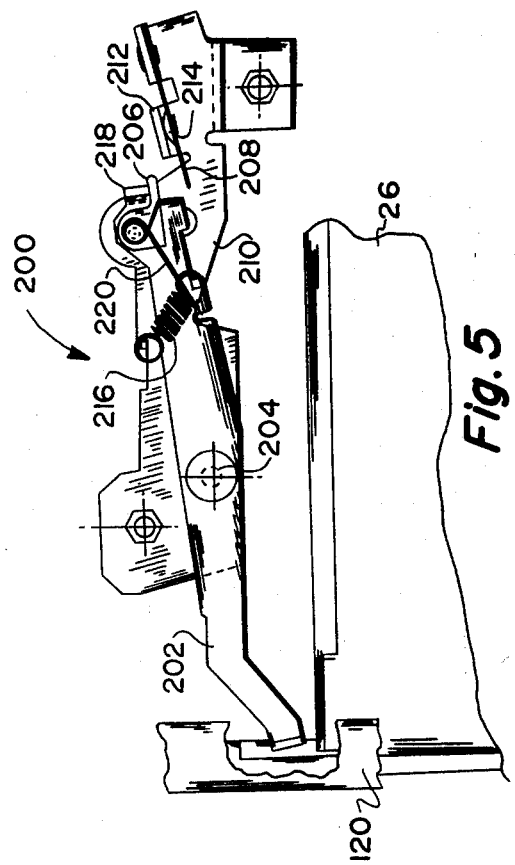
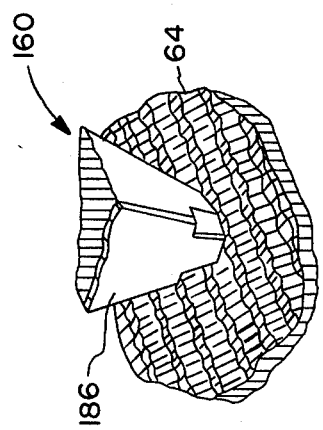
Fig. 5
Fig. 4

VIDEO DISC PLAYER HAVING CLICK MECHANISM

This invention relates to a caddy-type disc record player, and more particularly, to a mechanism for providing an audible indication when a full insertion of a caddy in the player is accomplished.

In certain systems, video information is stored on a disc record in the form of geometric variations in continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

To protect the video disc record, it is beneficial to enclose it in a caddy which comprises an outer jacket and a record retaining spine. The spine is provided with an opening in which a record is received to form a record/spine assembly. For record loading, a full caddy is inserted into the player along side rails. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the retained spine in place while allowing the retained record to be picked up by the turntable when it is raised. During playback, the pickup stylus is traversed radially across the record while the turntable spins the record at the desired speed (e.g., 450 rpm). For record retrieval, the record is transferred back to the receiving pads by lowering the turnable with respect to the receiving pads to redefine the record/spine assembly. An empty jacket is then inserted into the player, whereby the record/spine assembly is retrieved into the jacket. Reference is made to U.S. Patent application, Ser. No. 122,959, entitled "STYLUS CLEANING APPARATUS FOR VIDEO DISC PLAYER", now U.S. Pat. No. 4,285,524, filed in the name of L. M. Hughes et al, for an example of a caddy-type video disc player.

Sometimes when the caddy is inserted into the player, it is difficult to tell when it reaches the fully inserted position. It is necessary to fully insert the caddy each time to ensure the proper functioning of the record extraction mechanism.

A click mechanism, in accordance with this invention, includes a sensing layer which is displaced by the caddy as it is inserted into the player. A means, responsive to the displacement of the sensing lever, provides an audible indication as the caddy arrives at the fully inserted position in the player.

Figure 1:
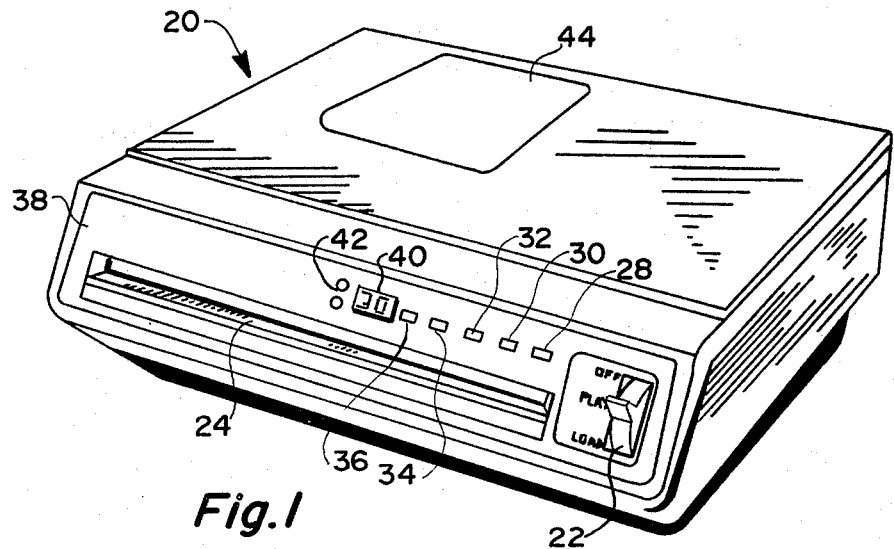
FIG. 1 shows a video disc player incorporating the present click mechanism.
Figure 3:
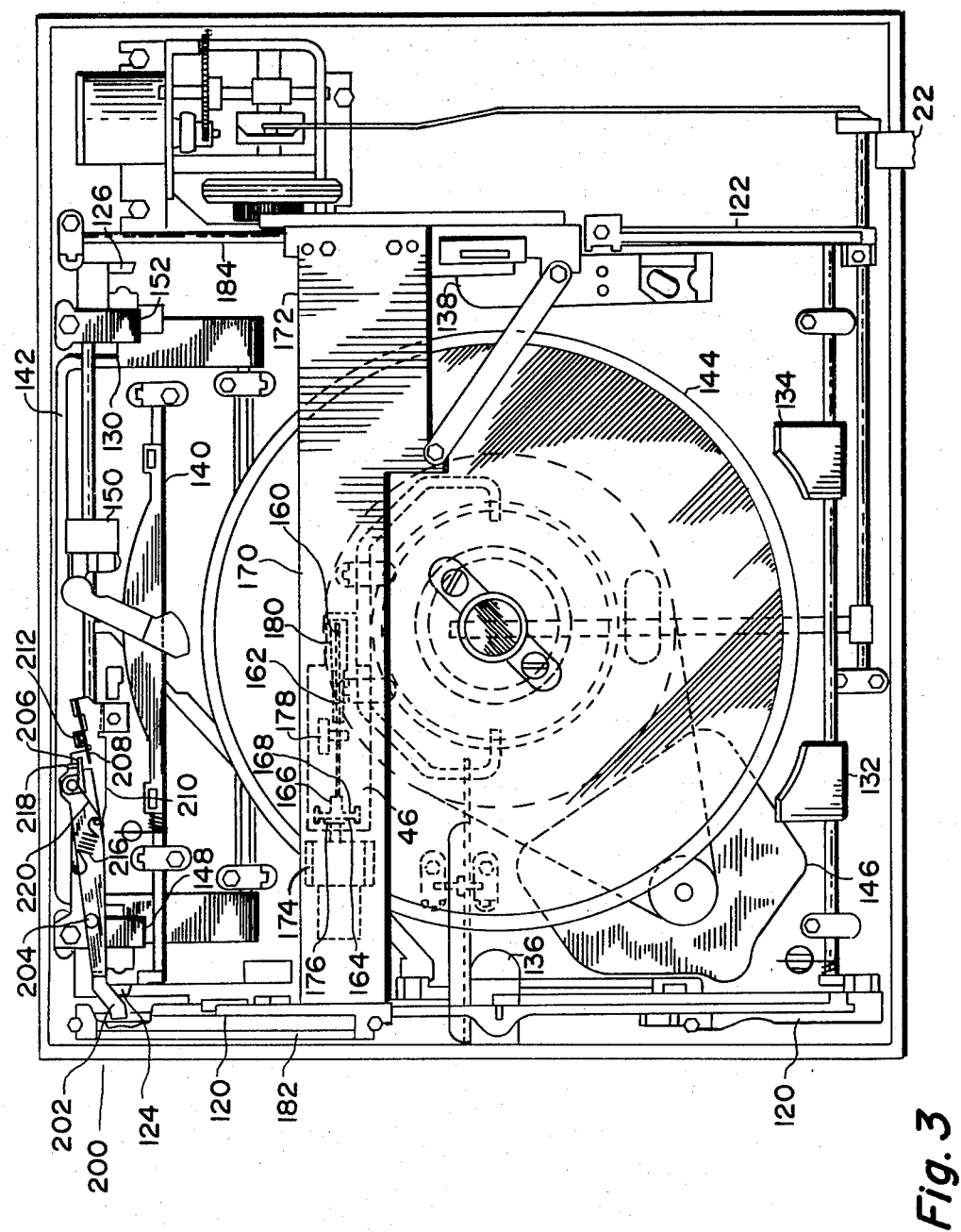

FIG. 3 provides a plan view of the player of FIG. 1;

FIG. 4 depicts the capacitance pickup concept employed in the player of FIGS. 1 and 3; and FIG. 5 is an enlarged top view of the instant click mechanism.

Shown in FIG. 1 is a video disc player 20 having the subject caddy-actuated click mechanism. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 which is shown in FIG. 3.

Figure 2:
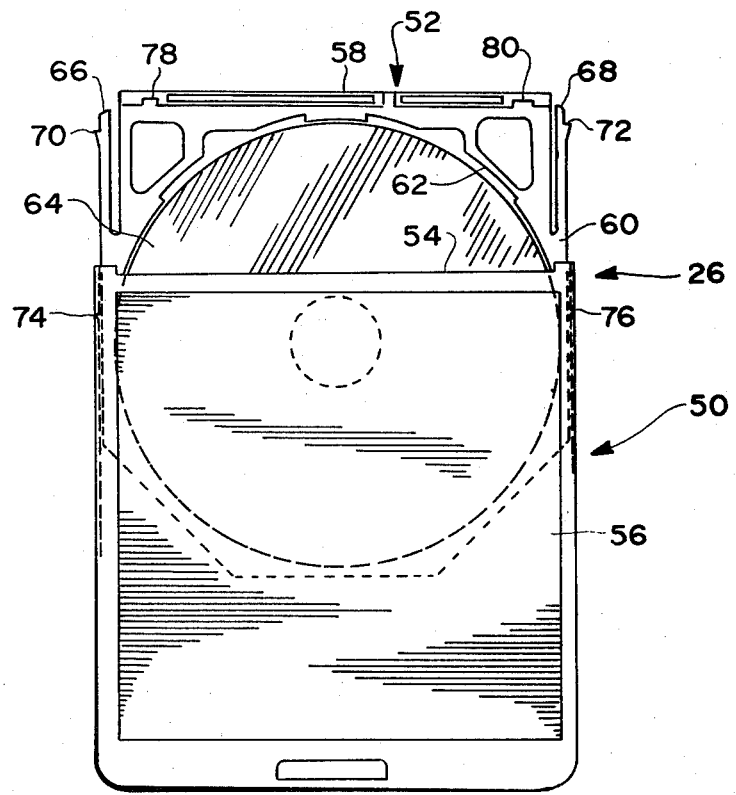
FIG. 2 illustrates a video disc caddy suitable for use with the subject mechanism in the practice of the present invention.

As shown in FIG. 2, the video disc caddy 26 comprises a jacket 50 and a substantially planar, record retaining spine 52. The jacket 50 has an edge opening 54 in communication with a cavity 56 for enclosing the record/spine assembly. The spine 52 has a portion 58 which serves as a closure, and a further portion 60 having a circular opening 62 for receiving a centrally-apertured record 64. The spine 52 is further provided with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for locking the spine 52 in place when it is fully inserted therein. The spine 52 is provided with cutouts 78 and 80 for selectively receiving the spine gripper members mounted in the player to secure the spine thereto in the manner explained later.

The operation of the caddy extraction mechanism will now be explained in conjunction with FIG. 3. To load a record into the player, a caddy 26 is guided into the input slot 24 along a path defined by side rails 120 and 122. As the caddy arrives at a fully inserted position in the player, latch defeat members 124 and 126 enter the jacket 50 to defeat the spine latch fingers 66 and 68 for freeing the spine 52 from the jacket. Pivotally mounted in the player are spine gripper members (only one of which can be seen in FIG. 3 and has been identified as 130) which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 124 and 126 and is latched to the player through the operation of the spine gripper members (e.g., 130), subsequent withdrawal of the jacket leaves the record/spine assembly in the player. The retained record/spine assembly is supported on a set of depressible receiving pads 132, 134, 136, 138 and 140. A pair of springs (not shown) disposed between a gripper arm 142, which carries the spine gripper members (e.g., 130), and the latch defeat members 124 and 126 effect downward deflection of the latch defeat members upon jacket withdrawal.

To transfer the retained record to a turntable 144, the function lever 22 is displaced to the PLAY position, which, in turn, raises the turntable and starts a turntable motor 146. A set of hold-down members 148, 150 and 152 hold the retained spine 52 in place against the receiving pads 132, 134, 136, 138 and 140 while permitting the retained record to be intercepted by the turntable 144 when it is raised. The hold-down members 148, 150 and 152 also serve to accurately locate the retained spine 52, longitudinally and laterally, in the player.

A pickup stylus 160 is disposed at one end of a stylus arm 162, the other end of which is secured to a latch plate 164 by means of a rubber coupler 166. The latch plate 164, in turn, is suspended in the cartridge 46 by means of a rubber diaphragm 168. The cartridge 46 is placed in a compartment 170 provided in a stylus arm carriage 172, and the carriage lid, not shown, is closed. Disposed in the carriage 172 is a slidably-mounted arm-stretcher transducer 174 (e.g., of the type described in U.S. Pat. No. 3,983,318) which is provided with a latch cup 176 subject to engagement with the latch plate 164. The transducer 174 is advanced in response to the closure of the cartridge lid to establish connection between the latch plate 164 and the latch cup 176.

A stylus arm lifting/lowering mechanism 178 (for example, of the general variety shown in U.S. Pat. No. 4,053,161) is mounted in the carriage 172 to selectively lower the pickup stylus 160 through an opening 180 provided in the bottom wall of the carriage to effect record engagement. During playback, the carriage 172 is translated on guide ways 182 and 184 disposed parallel to the caddy side rails 120 and 122 from a starting position at the back of the player toward the front of the player in synchronism with the radially inward motion of the pickup stylus 160. In the manner indicated in FIG. 4, the variations in capacitance between an electrode 186 carried by the stylus 160 and a conductive property of the record 64 are sensed to reproduce the stored information on the record. The recovered signals are processed to reconstruct a television signal containing picture and sound information for application of a television receiver.

To transfer the record back to the receiving pads 132, 134, 136, 138 and 140 after playback, the function lever 22 is depressed to the LOAD/UNLOAD position, which, in turn, lowers the turntable 144 to a level below the receiving pads. When the turntable 144 is lowered, the record is deposited on the receiving pads 132, 134, 136, 138 and 140 for reception in the opening 62 disposed in the spine 52 to redefine the record/spine assembly. The turntable motor 146 is shut off when the function lever 22 is displaced to the LOAD/UNLOAD position. The location of the receiving pads 132, 134, 136, 138 and 140, occupying the raised position thereof, is such that the record/spine assembly is aligned with the center line of the caddy side rails 120 and 122.

To retrieve the record/spine assembly, the empty jacket 50 is inserted into the player through the input slot 24 along the caddy side rails 120 and 122. As the jacket 50 arrives at the fully inserted position, the front edge thereof engages the already deflected latch defeat members 124 and 126 to cause further downward deflection thereof. Such further downward deflection of the latch defeat members 124 and 126, in turn, effects downward displacement of the spine gripper members (e.g., 130), whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

As previously indicated, it is sometimes difficult to tell when the caddy (hereinafter "caddy" means—caddy or jacket—) is fully inserted. To ensure that the spine is properly latched to and released from the player, it is necessary to insert the caddy sleeve all the way each time. The subject click mechanism 200, which provides an audible click as the caddy arrives at the fully inserted position in the player, will now be described in conjunction with FIGS. 3 and 5. When the caddy arrives near its fully inserted position in the player (e.g., about ¾" from being fully inserted), it contacts one end of a sensing lever 202. As the caddy is further inserted into the player, the sensing lever 202 is rotated about a pivot 204 disposed on a bracket 210.

A toggle 206, pivotally mounted at the other end of the sensing lever 202, engages a leaf spring 208, mounted on the bracket 210, as the sensing lever 202 is rotated. The leaf spring 208 moves away from a stationary member 212, disposed on the bracket 210, by the toggle 206 until the end of the toggle reaches the end of the leaf spring. The leaf spring 208 then snaps back and a brass button 214, disposed on the leaf spring, hits the stationary member 212 to make an audible sound. The parts of the click mechanism 200 are so dimensioned that the click sound occurs just as the caddy reaches its fully inserted position in the player.

When the caddy is extracted from the player, a lever return spring 216 resets the sensing lever 202 to a starting position (shown in FIG. 5). As the sensing lever is returned, the leaf spring 208 engages the toggle 206 and rotates it until the toggle slides past the leaf spring. The toggle 206 is then returned to a position against a stop member 218 by a toggle torsion spring 220.

Thus, in the arrangement described, an audible indication is provided when an occupied caddy is fully inserted into the player to load a record therein, and when an empty jacket is fully inserted into the player to retrieve a record therefrom.

What is claimed is:

1. In a record player for recovering prerecorded information from a disc record subject to removable occupancy of a protective caddy; an occupied caddy being inserted into said player along a path to load an enclosed record therein; said player being provided with a record extracting mechanism for removing an enclosed record from said caddy for retention in said player during the withdrawal of the caddy sleeve subsequent to the arrival of an occupied caddy at a fully inserted location along said path in said player; apparatus comprising:
   (A) a sensing lever subject to engagement with said caddy at an intermediate location along said path during the insertion of said caddy into said player; motion of said caddy from said intermediate location to said fully inserted location effecting displacement of said sensing lever;
   (B) means, responsive to said displacement of said sensing lever, for providing an audible indication as said caddy reaches said fully inserted location in said player; and
   (C) means for returning said sensing lever to a starting position upon the caddy withdrawal.

2. Apparatus as defined in claim 1 wherein said audible indication providing means includes an actuated member and a juxtaposed stationary member; said sensing lever deflecting said actuated member during said displacement thereof; said sensing lever freeing said actuated member as said caddy arrives at said fully inserted location, thereby allowing said actuated member to snap back and strike said stationary member to provide said audible indication.

3. Apparatus as defined in claim 2 wherein said means for returning said sensing lever to said starting position upon retraction of said caddy from said player comprises a return spring.

4. Apparatus as defined in claim 3 wherein said actuated member comprises a leaf spring.

5. Apparatus as defined in claim 4 wherein a toggle member is pivotally mounted on said sensing lever; said toggle member being biased against a stop member by a toggle spring; said toggle member engaging said leaf spring during said displacement of said sensing lever to effect said deflection of said leaf spring; said leaf spring striking said stationary member to produce said audible indication when it slides past said toggle member as said caddy reaches said fully inserted location in said player; said toggle member being rotated by said leaf spring away from said stop member until it slides past said leaf spring when said sensing lever is returned to said starting position by said return spring as said caddy is removed from said player; said toggle spring returning said toggle member against said stop member when said toggle member slides past said leaf spring; said return spring restoring said sensing lever to said starting position.

6. In a record player for recovering prerecorded information from a disc record subject to removable occupancy of a protective caddy; an occupied caddy being inserted into said player along a path to load an enclosed record therein; said player being provided with a record extracting mechanism for removing an enclosed record from said caddy for retention in said player during the withdrawal of the caddy sleeve subsequent to the arrival of an occupied caddy at a fully inserted location along said path in said player; apparatus comprising:

(A) first means subject to engagement with said caddy at a given location along said path during the insertion of said caddy into said player; and (B) second means responsive to said engagement of said first means and said caddy for providing an audible indication when said caddy reaches said fully inserted location in said player.

* * * * *